United States Patent Office 3,743,722
Patented July 3, 1973

3,743,722
ANTI-COAGULANT ISOLATION
Chris Nolan, Village of Gurnee, Ill., assignor to Abbott Laboratories, Chicago, Ill.
No Drawing. Continuation-in-part of abandoned application Ser. No. 44,580, June 8, 1970. This application July 14, 1971, Ser. No. 162,619
Int. Cl. A61k 17/00
U.S. Cl. 424—98     6 Claims

ABSTRACT OF THE DISCLOSURE

A new, one-step process for the purification and isolation of the thrombin-like fraction of the venom of certain pit vipers is described. The simple process uses affinity chromatography for the fractionation of native venom, employing specifically buffered loading and elution solutions. The chromatographic column uses an agmatine-coupled agarose packing.

CROSS-REFERENCE TO RELATED APPLICATIONS

This application is a continuation-in-part of copending application, Ser. No. 44,580, filed June 8,1970, now abandoned.

DETAILED DESCRIPTION OF THE INVENTION

For some years, it has been known that the venom of certain pit vipers, e.g., *Agkistrodon rhodostoms*, contains a component which is useful as an anti-coagulant. More recently, it was discovered that this component actually is a coagulant for blood. In its action, the thrombin-like material to which this invention is directed forms non-crosslinked fibrin polymer which is removed readily by the body's reticulo-endothelial and/or its fibrinolytic system thus lowering or depleting the fibrinogen of the blood. It therefore produces an anti-coagulant effect.

Unfortunately, the purification method known in the prior art leaves much to be desired. The best known method to date involves a two-stage chromatographic procedure, requiring two columns with different packings and two differently buffered solutions with different requirements for extraction solvents in the two stages. The substrate most commonly used for the first stage of this chromatographic method is triethylaminoethyl cellulose which unfortunately does not produce reliable and easily reproducible results. Worst of all, the so purified venom solution still contains all of the hemorrhagic factor which is the most dangerous component of the viper's venom. In any event, the so fractionated venom solution always needs further purification, for instance, by a similar chromatographic procedure, using a differently buffered solution of the active fraction from the first separation and a different column substrate.

It is therefore an object of the present invention to provide a simplified process for the production of pure thrombin-like material from the venom of certain pit vipers; it is a further object to provide a reproducible process for the isolation of the thrombin-like fraction of pit viper venom; it is another object for the thrombin-like activity from pit viper venom in purified form.

These and other objects are accomplished by buffering a clear, dilute, aqueous solution of native venom of a pit viper of which the venom contains a thrombin-like acting component to a pH of 7.5–8.1, placing said solution on a column packed with agmatine-coupled agarose beads, eluting the column at room temperature with a linear gradient sodium chloride solution buffered to a pH of 8.1±0.1, and pooling the fractions which contain the thrombin-like acting material. The above reference to agmatine-coupled agarose is intended to describe agarose beads to which 4-aminobutylguanidine (agmatine) is covalently bound. Agmatine has been found to be a competitive inhibitor of the thrombin-like acting material of the pit viper venom; it prevents the active material from being eluted from the column until almost all other protein materials are eluted when using a linear gradient sodium chloride solution of 0.01–1.0 molarity buffered within the above limits. The agmatine coupling of the agarose is done in known fashion, using activated agarose beads with a bead size preferably ranging between 40 and $200\times10^{-4}$ cm. in diameter in their wet stage. An agmatine-coupled agarose containing 60–120 micromoles of agmatine per gram of dry weight is suitable for the above process. The preferred range is between 90 and 100 micromoles of agmatine per gram, or about 1.15–1.3% by weight, as determined by analysis after 20 hours of hydrolysis on 5.7 N hydrochloric acid at 110° C.

In order to produce good reproducibility with the present process and a pure thrombin-like acting material, the bed volume of agarose shold be at least 35 ml./g. of venom. Of course, larger bed volumes may be used but no additional benefits are derived from such increased volume. Within a bed volume range of 35–100 ml./g. of venom, a flow rate of the linear gradient eluant between 20 and 40 ml./hr./cm.$^2$ cross sectional area, preferably between 25 and 30 ml./hr./cm.$^2$ is best suited to remove all impurities from the thrombin-like component without undue losses of the useful fraction.

The pit vipers which are known to include a thrombin-like active component that is useful as a defibrinolating agent include a number of species of the Agkistrodon and Bothrops genera of the Crotalidae family. These species are found in different parts of the world, predominantly in Southeast Asia (*Agkistrodon rhodostoma*) and South America (*Bothrops atrox*).

The term "native" used in describing the venom in the present description is meant to define the venom which has not been previously treated by other chromatographic or chemical procedures. Consequently, it contains other protein materials previously designated as fractions I–VIII including the hemorrhagic factor and fractions V and VII, i.e., those having similar physico-chemical characteristics as the coagulant factor with which the present isolation procedure is concerned. These undesirable fractions and components are completely eliminated from the native venom through the present process and no previous ion exchange treatment is needed. On the other hand, it will be understood that the term "native" as defined above does not imply that the venom must be virtually untouched prior to the present one-step separation; it may be centrifuged to eliminate sediments, lyophilized to improve stability and, of course, must be dissolved to satisfy the requirements of being applicable as a clear, dilute aqueous solution. If desired, the venom solution may be pre-treated with ammonium sulfate to remove certain undesired proteins therefrom. However, such treatment is not necessary as seen below.

The aqueous solution of the native venom may contain between 0.5 and about 5.0% by weight of the venom in the properly buffered pH range. The preferred buffer for this solution is a non-toxic salt of tris(hydroxymethyl) aminomethane, although other non-toxic buffers may be used in its place. The preference for a non-toxic buffer is based on the fact that the same buffer is also used in the eluting solvent and remains in part with the isolated protein fraction containing the thrombin-like activity. This eluate is ordinarily so pure that it may be directly used for medicinal purposes, although it usually requires dilution because a convenient injectable solution ordinarily contains between 50 and 200 units (as defined by Owren in Acta Medica Scandinavia, Suppl. 194 of 1947) of the thrombin-like activity per ml. while the present eluate often contains over 500 units/ml.

In a general embodiment of this invention, the buffered, dilute aqueous solution of the native venom is placed on the agarose beads which are pre-treated with agmatine. The column is then eluted with an aqueous sodium chloride linear gradient solution buffered to a pH of 8.1±0.1 with tris(hydroxymethyl)aminomethane hydrochloride or another non-toxic, pharmaceutically acceptable buffer. The eluate is collected in small fractions and the fractions containing the thrombin-like acting material are pooled. They contain about 80% of the thrombin-like activity of the native venom. In a preferred embodiment, the fractions are collected under refrigeration, i.e., at a temperature below 10° C. However, the agarose column should be maintained at a temperature between 22 and 28° C.

The agmatine-coupled agarose beads are prepared from a commercial agarose in bead form in known fashion. The bads are then placed in a column where they act as affinity chromatogram packing; they are extremely efficient in retaining the active venom protein while retaining the other proteins with much less affinity. During elution with the above described linear gradient, these other components are eluted before the active fraction appears, resulting in an extremely pure, isolated thrombin-like acting material ready for use as injectable except for dilution to the desired concentration. Suitable diluents are water, saline or a dilute tris(hydroxymethyl)aminomethane hydrochloride solution. The latter material may be added also when the obtained pooled eluate is of a pH that is unsuitable for intraveneous injections for which use the preferred pH range is close to 7 or slightly higher.

In order to illustrate the present method, reference is made to the following examples which, however, are not intended to limit the invention in any respect.

EXAMPLE 1

Agmatine was coupled to Sepharose 4B (a beaded agarose material of a wet bead size of 40–190μ and having an agarose content of about 4% which excludes protein of molecular weights above $20 \times 10^6$; marketed by Pharmacia, Ltd. of Sweden) by the procedure of Cuatrecasas et al., described in Proc. Natl. Acad. Sci., U.S. 61, 636 (1968) except that the pH was maintained at 11.0 for 15 minutes during CNBr-activation of the agarose and the coupling reaction was performed in tris(hydroxymethyl)aminomethane hydrochloride at pH 8.5, using 0.149 g. of agmatine sulfate per ml. of settled volume of agarose. The agmatine content of the agmatine-agarose prepared in this fashion was 96 micromols/g. dry weight.

A solution of 1.0 g. of lyophilized native venom of the Malayan pit viper in 100 ml. of 0.005 molar tris(hydroxymethyl)aminomethane hydrochloride of pH 7.5 was placed on a chromatographic column of 1.9 cm. diameter packed with the above agmatine-agarose beads to a height of 13 cm. The column was then eluted at room temperature at a flow rate of 60–80 ml./hour with a linear gradient sodium chloride solution between 500 ml. of 0.01 molarity and 500 ml. of 0.5 molarity, both solutions buffered to a pH of 8.1 with tris(hydroxymethyl) aminomethane hydrochloride. The eluate was collected in fractions of 5–7 ml. in a refrigerated automatic fraction collector. The first 400 ml. of eluate were almost totally inactive; subsequent fractions, however, were highly active and contained, aside from the desired coagulant component, only inert materials. The pooled fractions containing the active material were found to contain slightly more than 80% of the initially present thrombin-like activity and 90% of the recovered activity had a specific activity of 1200

(specific activity = units/ml./$A^{1 cm.}_{280 nm.}$)

When the Sepharose used in the above process was replaced by Bio-Gel A–15 M of wet mesh size 50–100 (an agarose marketed by Bio-Rad Laboratories, Richmond, Cal. The designation "A" indicates that the resin is agarose and "15 M" indicates that molecules of a weight above $15 \times 10^6$ will not be adsorbed or retained), the resulting pooled fractions shows the same potency and degree of purification as above. The same result was also obtained when the upper gradient concentration was 1 molar of sodium chloride.

The pooled fractions containing thrombin-like material were compared with a previously identified pure sample of the isolated thrombin-like material from pit viper venom obtained by previously used methods: the two samples were found to be identical in the polyacrylamide gel electrophoresis method using 7.0% gels at pH 8.9 described by Ornstein in Annals of N.Y. Acad. of Science, volume 121, page 321 (1964) showing identical electrophoretic mobilities, by gel filtration on Sephadex G–100, (a dextran gel, partially cross-linked and containing random ether linkages which separates substances with molecular weights smaller than $10^5$, marketed by Pharmacia), indicating the same molecular weight, by enzyme activity criteria, namely enzyme specifity and potency, including invivo difibrinogenation. The coagulant activity test by the thrombin clotting time method showed no difference between the two samples and the hemmorrhagic factor was totally absent from both. Both materials cause purified plasma fibrinogen to clot.

EXAMPLE 2

A solution of 50 mg. of lyophilized venom of Bothrops atrox in 5 ml. of the 0.01 molar buffer of Example 1 at pH 8.1±0.1 was centrifuged to clarify and applied to a $1 \times 15$ cm. column of agmatine-agarose. The column was eluted at room temperature at 20–25 ml./hr. with five column-bed volumes of the above buffer at pH 8.1±0.1 and with a linear sodium chloride gradient between 150 ml. of the above buffer and 150 ml. of the same buffer made 0.3 molar with sodium chloride. Fractions of 5 ml. were collected as in Example 1.

The separate fractions were tested for their thrombin-like activity. When plotting this activity against the fraction numbers, three distinct peaks of activity were found. Although the material of all three peaks had thrombin-like activity, only the material of the third peak produces a clot with purified fibrinogen and is therefore most similar with the material obtained in Example 1.

EXAMPLE 3

By repeating the above procedure with a more dilute sample of the venom of Crotalus adamanteus, the thrombin-like activity of this venom was separated from other protein fractions associated with that venom and obtained in highly purified form.

It will be recognized that the present method greatly simplifies the procedure to isolate the active coagulant component from snake venom. In particular, it will be noted that only a single affinity chromatogram is required to obtain a pure material which previously was available only by a two-stage method, producing a material of identical potency, molecular size, anti-coagulant activity and matching in other physical and chemical identification respects. It is particularly noteworthy and surprising that a simple affinity chromatogram is the only requirement to obtain a purified, high potency, directly useable thrombin-like material from previously untreated snake venom.

In view of the surprising efficiency of the present purification and isolation procedure and the fact that the obtained solution is directly useable for its intended medicinal purpose except for adjusting the concentration, it will be seen that the buffer and salt concentration of the venom solution should be prepared with pyrogen-free materials and non-toxic salts as buffers. For this reason, physiologically acceptable salts are used as buffers in amounts which produce a physiologically useful concentration such as an isotonic solution. If desired, a preservative may be added to the venom solution initially or such a component may be added subsequently to the purified, isolated coagulant fraction if that solution is intended for storage or extended shelf-life. Numerous preservatives are suitable for this purpose, e.g., benzyl alcohol, methyl and/or propyl p-hydroxybenzoate, chlorobutanol and the like. Usually, 0.05 to 1.0% of such a preservative is sufficient to satisfy all normal storage requirements.

I claim:

1. The process of isolating the thrombin-like acting component from the venom of a pit viper known to contain a thrombin-like acting component consisting essentially in buffering a clear, aqueous solution containing 0.5 to 5% by weight of native venom of such a pit viper to a pH of 7.5–8.1, placing said solution on a column packed with agmatine-coupled agarose beads containing 60–120 micromoles of agmatine per gram, eluting the column at room temperature with a linear gradient sodium chloride solution buffered to a pH of 8.1±0.1 wherein said gradient begin with a molarity of 0.01 and ends with a molarity of 1.0, and pooling the fractions which contain the thrombin-like acting material.

2. The process of claim 1 wherein said linear gradient of the sodium chloride solution begins with a molarity of 0.01 and ends with a molarity of 0.5.

3. The process of claim 1 wherein said venom solution and said eluting liquid both are buffered with a non-toxic salt of tris(hydroxymethyl)aminomethane.

4. The process of claim 3 wherein said non-toxic salt is the hydrochloride salt.

5. The process of claim 1 wherein said venom is the venom of the viper *Agkistrodon rhodostoma*.

6. The process of claim 1 wherein said venom is the venom of the viper *Bothrops altrox*.

References Cited

Chemical Abstracts, 64:4878C (1966).
Chemical Abstracts, 67:89140Z (1967).
Williams et al. Biochem. J. (1962) 84, 52–62.

ALBERT T. MEYERS, Primary Examiner

N. A. DREZIN, Assistant Examiner

U.S. Cl. X.R.

424—95